Dec. 2, 1924.
J. E. G. LAHOUSSE
1,517,911
PROCESS AND APPARATUS FOR TESTING TEXTILES
Filed Aug. 24, 1923
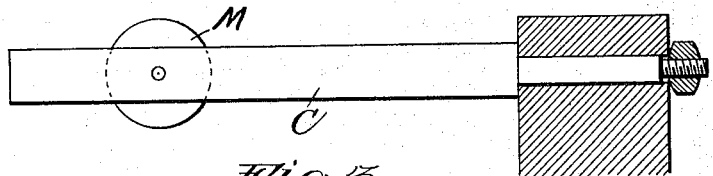
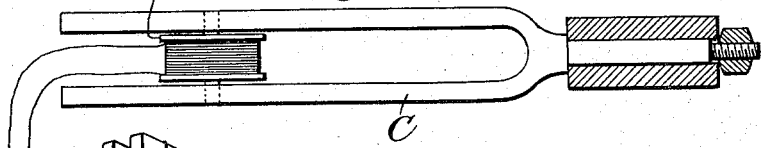
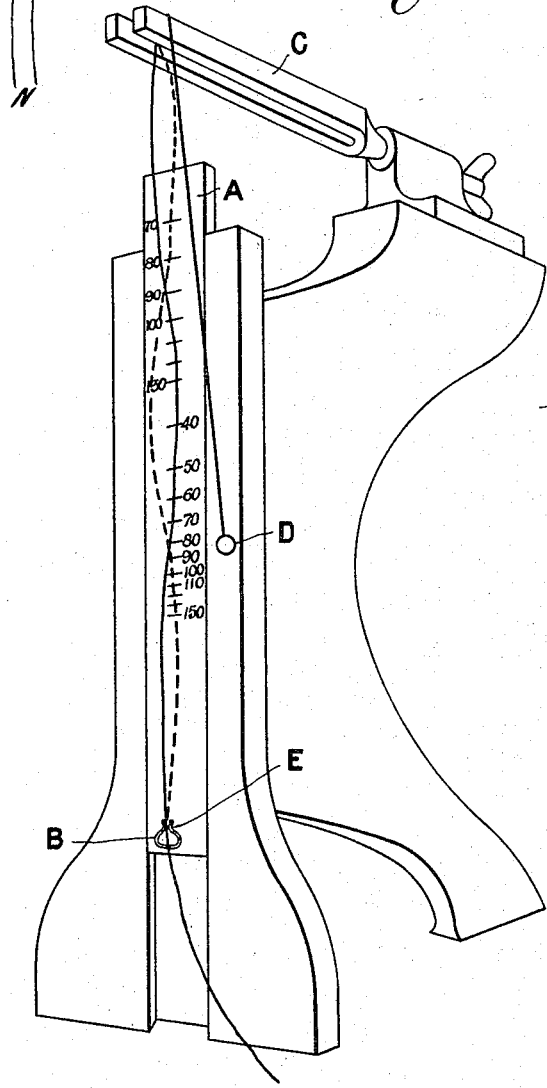
INVENTOR:
Joseph E. G. Lahousse
BY Wm Wallace White
ATT'Y.

Patented Dec. 2, 1924.

1,517,911

UNITED STATES PATENT OFFICE.

JOSEPH EDOUARD GUSTAVE LAHOUSSE, OF TERNAY, FRANCE, ASSIGNOR TO SOCIETE CHIMIQUE DES USINES DU RHONE, OF PARIS, FRANCE.

PROCESS AND APPARATUS FOR TESTING TEXTILES.

Application filed August 24, 1923. Serial No. 659,092.

*To all whom it may concern:*

Be it known that I, JOSEPH EDOUARD GUSTAVE LAHOUSSE, of Villa Montagny, Ternay, Isere, France, a citizen of the Republic of France, have invented certain new and useful Improvements in Processes and Apparatus for Testing Textiles, of which the following is a specification.

The apparatus actually in use for testing textiles are based upon the weighing of a known length of thread. It follows that it is necessary to operate upon a relatively great length of thread, the result being only a mean value, without any indication concerning the variations which may exist along the thread. It is, however, to be borne in mind that it is the weak sections the mechanical resistance of which is to be considered when weaving, and information as to their value relatively to the mean value is therefore of interest.

According to this invention, the thread is caused by suitable means to vibrate with a known frequency and under a known tension, and the mass per unit length of the thread is ascertained by measuring the distance between two consecutive nodes.

If F is the tension of the thread, $h$ the distance between two consecutive nodes, $n$ the frequency (couple or double oscillation), $d$ the mass per unit length of the thread, then, in many systems of units, such as the C. G. S. system:—

$$d = \frac{F}{4h^2 n^2}.$$

The test is performed very rapidly, without any weighing. The method allows the testing of a very small length of thread, and therefore to follow the variations of the thread along its length, by testing successive lengths.

The measurements obtainable are susceptible of a much greater accuracy than is actually required for industrial purposes and if an accuracy of ±1% only is sufficient, the test may be carried out with a very simple and strong apparatus.

In the appended drawings, which illustrate an example of an apparatus adapted for carrying out the test described above, Fig. 1 is a perspective view of such apparatus adapted for operation by hand; and Figs. 2 and 3 are respectively a side and a plan view of the tuning fork provided with an electromagnet for maintaining the vibrations of the fork.

The apparatus consists in a stand provided with a sliding scale A, suitably graduated, and carrying a tuning fork C secured horizontally, and the frequency of vibration of which is known. The thread is clamped in the jaws of a small weight B, which keeps it under a known tension, and is passed into a notch on one of the prongs of the tuning fork. It is then gripped under a tightening screw D.

To perform a test with this apparatus, it is first necessary to find by trial a suitable length of thread for which the vibrations are of the greatest possible amplitude and with at least a node between the tension weight B and the tuning fork. When this length has been ascertained, the thread is clamped in such a position that the index E of the scale coincides with the place on the thread at which the weight B is attached. The tuning fork being set in vibration, the graduation of the sliding scale opposite the first node above the weight B will give the measurement required, according to the graduation of the sliding scale, length from E, if graduated in centimetres, or mass per unit length of the thread, in suitable units, as may be required according to the nature of the thread tested, silk, wool or cotton.

Several scales may be provided, each one corresponding to a particular tension weight.

The formula given above allows of easy graduation of the scale, given the frequency of the tuning fork and the tension weight. It gives the distance of the lower node from the index E, but it may be advantageous to obtain readings of the scale corresponding to the second and when possible, to the third node, in order to increase the accuracy of the measurement. To each node naturally corresponds a different graduation.

The tuning fork may be put in vibration by hand by means of a wedge forced between its prongs and suddenly withdrawn. When the apparatus is almost continually in use, however, it is preferable to maintain the vibrations electrically by known means, thus increasing considerably the ease with which the tests are performed. The electrical maintenance of the vibration is particularly easy if the frequency of the fork is selected to be the same as that of the electric supply, as in this case a simple electromagnet M (Figs. 2 and 3) placed between the prongs of the tuning fork and connected to the electrical mains will ensure the maintenance of the vibrations. By loading one or both prongs, one may adapt the apparatus to work at a lower frequency, the graduation of the scale being altered accordingly.

The current may be cut off just before each reading, the fork vibrating then with its own frequency. In this manner, variations of frequencies of the supply will not affect the measurements.

The thread may be caused to pass continuously or intermittently through the apparatus, by any suitable device; in the latter case, the readings being taken while the thread is stationary.

It will be understood that the invention is not limited to the particular apparatus described as an example, but comprises any arrangement based on the principle stated above.

What I claim and desire to secure by Letters Patent is:—

1. A process for testing textiles, consisting in passing successive lengths of the textile thread, under a known tension, between two points of attachment at one of which vibrations of known frequency are imparted to the thread and to measure the distance between one of the said points of attachment and one of the nodes.

2. An apparatus for testing textiles, comprising a stand, a sliding scale, means for exerting a constant tension on a length of thread, at one end thereof means for imparting vibrations of constant frequency to the other end of the thread, and means for clamping the thread in position.

3. An apparatus for testing textiles, comprising a stand, a sliding scale, a weight provided with a clamping member, a tuning fork, and a clamping screw.

4. An apparatus for testing textiles, comprising a stand, a sliding scale, a weight provided with a clamping member, a tuning fork, means for sustaining electrically the vibration of said tuning fork, and a clamping screw.

5. An apparatus for testing textiles, comprising a stand, a sliding scale, graduated in units of current use in the textile industry, means for exerting a constant tension on a length of thread, at one end thereof, means for imparting vibrations of constant frequency to the other end of the thread, and means for clamping the thread in position.

In testimony whereof I have signed my name to this specification.

JOSEPH EDOUARD GUSTAVE LAHOUSSE.

Witness:
JULIAN CEMBLE SMEDT.